United States Patent [19]

Dougherty et al.

[11] Patent Number: 4,632,814
[45] Date of Patent: Dec. 30, 1986

[54] PROCESS FOR STABILIZING PHOSPHORIC ACID

[75] Inventors: Steven J. Dougherty, Sumner, Wash.; Ray E. Barker, Terre Haute, Ind.

[73] Assignee: International Minerals & Chemical Corp., Terre Haute, Ind.

[21] Appl. No.: 811,335

[22] Filed: Dec. 20, 1985

[51] Int. Cl.$^4$ ............................................. C01B 25/16
[52] U.S. Cl. ................................. 423/321 R; 423/317; 423/320
[58] Field of Search ................ 423/317, 321 R, 321 S, 423/320

[56] References Cited

U.S. PATENT DOCUMENTS

| | | | |
|---|---|---|---|
| 1,562,818 | 11/1925 | Wolfes | 423/32 R |
| 3,099,622 | 7/1963 | Woerther | 423/321 R |
| 3,371,991 | 3/1968 | Sergeys et al. | 423/321 R |
| 3,488,686 | 4/1967 | Dunwoody et al. | 159/47 |
| 4,110,422 | 8/1978 | Hill | 423/317 |
| 4,248,846 | 2/1981 | Hill | 423/317 |
| 4,487,750 | 12/1984 | Astley et al. | 423/321 R |

*Primary Examiner*—Gregory A. Heller
*Attorney, Agent, or Firm*—Wendell R. Guffey; Thomas L. Farquer

[57] ABSTRACT

An improved process for stabilizing wet process phosphoric acid is described in which the acid is treated with pressurized carbon dioxide and then is aged so as to enhance the rate of post-precipitation.

14 Claims, No Drawings

PROCESS FOR STABILIZING PHOSPHORIC ACID

BACKGROUND OF THE INVENTION

1. Field of the Invention

This invention relates to a process for stabilizing wet process phosphoric acid. In particular, this invention relates to a process for stabilizing wet process phosphoric acid by enhancing the rate of post-precipitation of impurities.

2. Description of the Prior Art

Wet process phosphoric acid is obtained by acidulating phosphate rock with a mineral acid, such as sulfuric acid. Wet process phosphoric acid typically contains numerous suspended and dissolved impurities, principally gypsum, but also including iron, aluminium and magnesium compounds. While, most of these impurities are separated in what are now conventional purification and concentration steps for making wet process acid, and thus need not be described in any detail, a significant amount of these impurities remain in the concentrated commercial grade acid.

The wet process acid usually is concentrated to about 50–60% $P_2O_5$ for shipment. This concentrated product generally is referred to as merchant acid. During subsequent storage and shipment of the concentrated merchant acid, residual impurities in the acid form a precipitate or sludge which separates slowly over time from the concentrated acid causing numerous problems. This sludge, known in the art as post-precipitate, is difficult and costly to remove from the concentrated acid.

While various procedures have been proposed in the prior art for remedying the problem of post-precipitation, they all suffer from a variety of infirmities. Thus, a continuing need exists in this art for a simple technique for reducing the post-precipitation of impurities from concentrated wet process phosphoric acid.

SUMMARY OF THE INVENTION

It is an object of this invention to provide a method for stabilizing wet process phosphoric acid with respect to post-precipitation.

It is another object of this invention to provide a simple and inexpensive method for stabilizing wet process phosphoric acid with respect to post-precipitation.

It is also an object of this invention to provide a method for stabilizing wet process phosphoric acid by significantly enhancing the rate of post-precipitation.

These and other objects which will be apparent to those skilled in this art are achieved by the present invention which provides a process for enhancing the rate of post-precipitate formation in concentrated wet process phosphoric acid comprising the steps of contacting said concentrated acid in a pressure vessel with high pressure carbon dioxide at a pressure of at least about 600 psig, aging the carbon dioxide treated acid until a precipitate forms and separating said precipitate from said acid.

DETAILED DESCRIPTION

The present invention pertains to a process for enhancing the rate of post-precipitate formation in wet process phosphoric acid. Thus, the present invention provides a method for preparing a concentrated wet process phosphoric acid which exhibits a reduced level of further post-precipitation. Unless otherwise noted, all percentages reported throughout the specification and claims are by weight.

In the conventional method for preparing phosphoric acid, phosphate rock is acidulated with a mixture of sulfuric acid and recycled phosphoric acid and the reaction product is filtered to remove the bulk of the solid by-products formed, principally gypsum. These steps need not be described here because they are well-known in the art. By the time the acid is concentrated to a $P_2O_5$ concentration of about 40%, the major portion of the objectionable impurities have been separated and the acid often is sent to storage pending further concentration to the marketable merchant grade acid. Unfortunately, the recovered crude acid still contains a significant quantity of dissolved and suspended impurities. This concentrated crude acid is concentrated further, generally to about 50–60% $P_2O_5$, either prior to or subsequent to storage, and then is marketed.

To increase the marketability of this acid for use for example in the manufacture of fertilizer or for making animal feed products, it is highly desirable to remove more of the impurities from the concentrated wet process acid. The method of this invention is directed to that goal.

In the practice of this invention, a concentrated wet process phosphoric acid is contacted with high pressure carbon dioxide. This contacting can be conveniently, although not necessarily, carried out using a concentrated acid having any $P_2O_5$ concentration above about 40%. Advantageously, it can be practiced using the marketable 50–60% $P_2O_5$ merchant grade acid concentrate.

Contacting of the concentrated acid and carbon dioxide is carried out in a pressure vessel under conditions which result in substantially complete saturation of the acid with carbon dioxide and the formation of a precipitate. The carbon dioxide is preferably supplied at a pressure of 600 psig or higher, preferably the carbon dioxide pressure is between about 900 and its critical pressure. The contacting temperature is not critical, although it is preferable to contact the acid and carbon dioxide at ambient temperature, e.g., at a temperature between about 15° and 35° C.

Any process for contacting the acid and carbon dioxide can be used and many techniques will be apparent to those skilled in the art. Thus sparging of the carbon dioxide at an elevated pressure into the acid is effective for achieving substantially complete saturation. The duration of the contacting step does not appear critical and contacting for as little as 15 minutes should provide an enhancement in post-precipitate formation. Contacting for times of between 3 hours and 24 hours have been successfully employed. A suitable contacting method is simply to expose well-mixed concentrated acid to a high pressure carbon dioxide atmosphere, e.g., carbon dioxide at about 1000 psig, in a pressure chamber or vessel, for a period of several hours, e.g., about 3 hours.

After sufficiently contacting the concentrated acid with the pressurized carbon dioxide, the acid is removed from the pressure vessel and allowed to age, i.e., stand. This enhances formation and separation of the precipitate. Gentle agitation of the acid at this point facilitates precipitate formation. Generally the acid is allowed to stand for several hours, e.g., at least about 4 hours. The acid may be allowed to age for 2 days or more. During this time a substantial amount of sludge impurity precipitates and settles from the acid. The sludge then is separated from the acid using any well known solid-liquid separation technique, e.g., by decantation, filtration, or centrifugation.

The recovered precipitate has value as a fertilizer and can be incorporated into mixed fertilizers for its phosphorous content.

Although the reason for the success of the present invention is not well understood and not intending to be bound to any particular explanation, applicants believe that the enhanced rate of post-precipitation may be attributable to such factors as (i) a viscosity reduction in the concentrated acid by virtue of the solubilized carbon dioxide and (ii) solubilization of precipitate-inhibiting humics into the overlying (dense) carbon dioxide phase thus promoting crystal growth in the acid phase.

The process of this invention will be better understood with reference to the following examples. It is understood, however, that these examples are intended only to illustrate the invention and are not intended to limit the invention.

EXAMPLE 1

A sample of filtered wet process acid having a concentration of about 30% $P_2O_5$ was obtained from a commercial production unit. A two liter portion of this acid was concentrated by vacuum evaporation to about 40% $P_2O_5$—final evaporation condition of 15.5 inches of mercury (vacuum) at 100° C. The acid was allowed to cool to room (ambient) temperature, was centrifuged to remove solids and then was divided into two parts. One part was placed in an autoclave with pressurized carbon dioxide at a pressure of about 1000 psig. The acid was well-mixed and remained at a temperature of about 25° C. in contact with the pressurized atmosphere of carbon dioxide overnight in the autoclave. The treated sample then was removed from the autoclave and was allowed to age undisturbed. The second part received no treatment and served as a control.

Both acids were examined one day after the treated acid was removed from the autoclave. By visual observation the carbon dioxide treated acid had significantly more precipitate than the untreated control. The samples then were centrifuged to separate the precipitated solids and both the treated acid and the untreated control acid were analyzed. The analysis results are tabulated below and show that there was a substantial decrease in the iron content of the treated acid relative to the untreated control.

TABLE 1

| | Concentration (%) | | | | | | |
|---|---|---|---|---|---|---|---|
| | $P_2O_5$ | Fe | Al | Mg | F | Si | $SO_4$ |
| Control Sample | 44.0 | 1.30 | 0.67 | 0.39 | 1.28 | 0.21 | 1.5 |
| Treated Sample | 44.2 | 0.48 | 0.72 | 0.39 | 1.19 | 0.20 | 1.4 |

EXAMPLE 2

A sample of filtered wet process acid having a concentration of about 30% $P_2O_5$ was obtained from a commercial production unit. A two liter portion of this acid was concentrated by vacuum evaporation to about 54% $P_2O_5$. At the end point of the vacuum evaporation the temperature was about 100° C. and the pressure was 25.5 inches of mercury (vacuum). The acid was allowed to cool to room temperature, was centrifuged to remove solids, and then was divided into two parts. One part was stirred in a beaker in an autoclave pressurized with carbon dioxide at a pressure of about 1000 psig and a temperature of about 30° C. The sample was held in the autoclave for about three hours. The pressure then was released and the treated acid was allowed to age undisturbed overnight. The second part received no treatment and served as a control.

After aging the treated sample overnight, both acids were examined. On visual inspection, the treated acid appeared to be full of precipitate while the control sample had only about 10% of its total volume occupied with precipitate. The samples then were centrifuged to separate the precipitate and both the control sample and the treated acid were analyzed. This experiment then was repeated with an additional two liter portion of vacuum concentrated acid. The results for both experiments are tabulated below. As shown, there was a substantial decrease in the iron content of the treated acids relative to the untreated controls. The quantity of post-precipitate in the treated samples, however, was about 50% of the weight of the feed acid, thus suggesting that a large amount of phosphorous reported to the precipitate.

TABLE 2

| | Test A | | Test B | |
|---|---|---|---|---|
| | Control Sample | Treated Sample | Control Sample | Treated Sample |
| $P_2O_5$ % | 55.7 | 55.9 | 55.1 | 53.8 |
| Fe (%) | 2.19 | 1.81 | 2.69 | 1.62 |
| Mg (%) | 0.72 | 0.71 | 0.56 | 0.60 |
| Al (%) | 1.04 | 1.04 | 0.99 | 0.97 |
| K (ppm) | 2 | 2 | 3 | 4 |
| Na (ppm) | 1300 | 1200 | 84 | 110 |
| $SO_4$ (%) | 2.30 | 2.20 | 2.3 | 2.2 |

Although the present invention has been described in connection with specific examples, it is to be understood that various modifications are possible and this invention is to be limited only by the scope of the appended claims.

We claim:

1. A process for removing sludge-forming components from a wet process phosphoric acid comprising the steps of contacting the acid in a pressure vessel with high pressure carbon dioxide at a pressure of at least about 600 psig, aging the carbon dioxide treated acid until sludge-forming components precipitate and separating said precipitated sludge-forming components from said acid.

2. The process of claim 1 wherein said high pressure carbon dioxide is at a pressure of between about 900 psig and its critical pressure.

3. The process of claim 1 wherein said contacting is conducted at an ambient temperature within the range of about 15° to 35° C.

4. The process of claim 3 wherein said contacting is conducted for a period of time between about 3 hours and 24 hours.

5. The process of claim 4 wherein said acid is allowed to age for a period of time between about 4 and 48 hours after said contacting.

6. The process of claim 1 wherein said acid has a concentration of at least about 40% $P_2O_5$.

7. The process of claim 6 wherein said acid has a concentration of between about 50% and 60% $P_2O_5$.

8. The process of claim 5 wherein said acid has a concentration of at least about 40% $P_2O_5$.

9. The process of claim 8 wherein said acid has a concentration of between about 50% and 60% $P_2O_5$.

10. A process for enhancing the rate of post-precipitate formation in wet process phosphoric acid comprising the steps of contacting, for at least about 0.25 hours, the acid in a pressure vessel with high pressure carbon dioxide at a pressure of between about 600 psig and the critical pressure for carbon dioxide, depressurizing said acid, aging said acid until sludge-forming components precipitate, and separating precipitated solids from said acid.

11. The process of claim 10 wherein said acid has a concentration of at least about 40% $P_2O_5$.

12. The process of claim 11 wherein said contacting is conducted at ambient temperature within the range of about 15° to 35° C.

13. The process of claim 12 wherein said contacting is conducted for a period of time between about 3 hours and 24 hours.

14. The process of claim 13 wherein said acid is allowed to age for a period of time between about 4 and 48 hours after said contacting.

* * * * *